Sept. 20, 1960   N. R. SMITH   2,953,178
MEAT SCRAPER
Filed July 15, 1957
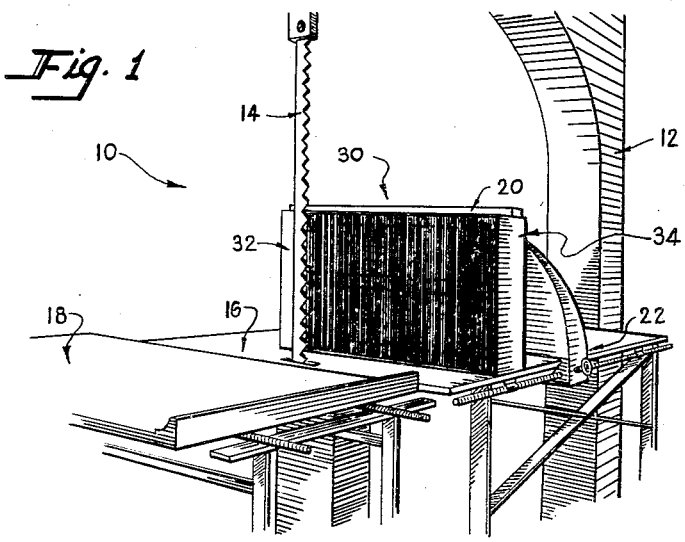
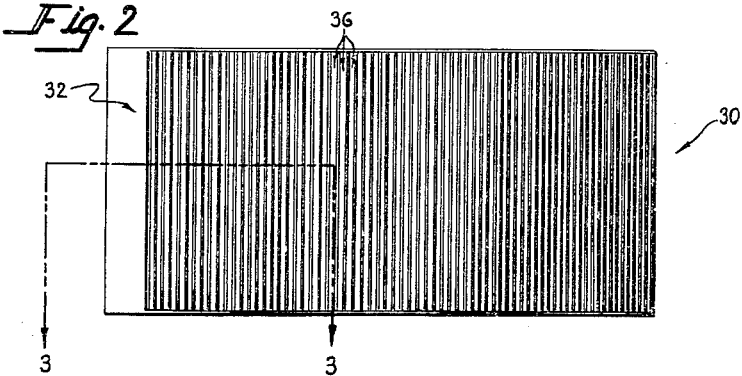
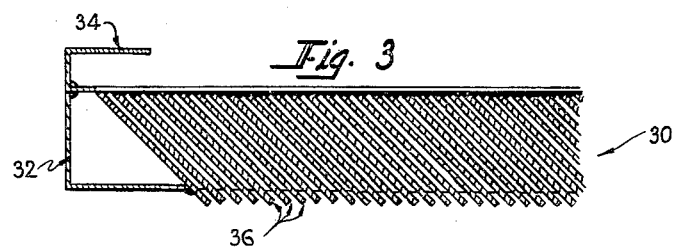
INVENTOR.
NORMAN R. SMITH
BY Paul B. Fike
PATENT AGENT

United States Patent Office 2,953,178
Patented Sept. 20, 1960

2,953,178
MEAT SCRAPER

Norman R. Smith, 198 Brooklyn Ave., San Jose, Calif.

Filed July 15, 1957, Ser. No. 671,800

6 Claims. (Cl. 146—88)

The present invention relates to meat-cutting devices, and more particularly to a meat scraper that is adapted particularly for use with power driven meat-cutting band saws.

As the small local markets have been gradually supplanted by the extremely large super markets, the amount of all produce of any type handled has increased tremendously; and particularly, the amount of meat that must be cut and otherwise prepared for the customer has become so voluminous as to warrant the usage of power driven meat-cutting says. While it is undoubtedly true that the capacity for meat preparation has been substantially increased by the installation of such power driven equipment, yet a very serious problem has arisen precisely through such use. When any meat is cut by a power driven band saw, there remains on the surface of the meat a certain amount of bone dust and ground suet which, quite obviously, must be removed prior to the presentation of the meat cut to the customer. Such removal has been normally accomplished by wiping the surface of the meat with a rag which is not only time consuming, but somewhat unsanitary. With regard to the time factor, it has been found in practice that as much, if not more time, is required to cleanse the dust and suet from the surface of the meat than is required for the actual cutting operation itself.

Accordingly, it is a general object of the present invention to provide a meat scraper which facilitates the meat cleansing operation.

More particularly, it is a feature of the invention to provide a meat scraper that is adapted for conjoined use with a power driven meat-cutting device such as a band saw in a manner such that the scraping operation is performed simultaneously with the cutting operation.

In addition, it is a feature of the invention to provide a meat scraper that is arranged for use with a power driven band saw in a manner such that the scraper not only fulfills the scraping function but also functions as a gauge plate to determine the thickness of the cut to be made.

Another feature relates to the precise design of the meat scraper which allows for its use over an extended period without cleansing.

Additionally, it is a feature to provide for the removable association of the meat scraper with the power driven meat-cutting device so that it can be readily removed and cleansed when desired.

These and other objects and features of the invention will become more apparent from a perusal of the following description of the structure shown in the accompanying drawing, wherein:

Fig. 1 is a perspective view of a meat-cutting band saw with the meat scraper embodying the present invention incorporated therewith, Fig. 2 is an enlarged side elevation view of the meat scraper removed from its association with the band saw, and Fig. 3 is a fragmentary sectional view taken along line 3—3 of Fig. 2.

With initial reference to Fig. 1, there is shown a band saw, indicated by the numeral 10, of the general type employed for the cutting of meat. The particulars of the structure of such band saw 10 will not be described, since they are not pertinent to the present invention; and, as will be apparent from the following description of the invention itself, any other meat cutting structures deviating considerably from that illustrated in Fig. 1, can be used in conjunction with the invention. Briefly, the band saw 10 includes a frame 12 and incorporated mechanism which supports a band saw blade 14 for rectilinear movement along a vertical flight. The vertical flight of the saw blade 14 extends through a substantially horizontal table that includes a stationary portion 16 and a movable portion 18, the latter being adapted to support the meat for movement against the teeth of the moving saw blade. A gauge plate 20 is supported over the stationary portion 16 of the table in substantial parallelism to the plane of the saw blade 14 and is laterally adjustable by use of an adjustment mechanism, indicated at 22, so that the end of the meat to be severed may be urged laterally against the plate so as to ultimately determine then the thickness of the cut made when the meat is moved against the saw blade 14.

In accordance with the present invention, a meat scraper, generally indicated by the numeral 30, is removably attached to the described gauge plate 20 and itself serves then to determine the thickness of the cut to be made. It will be apparent even at this point that the gauge plate 20 already existing on the band saw 10, can, in actuality, be eliminated since its gauging function is now performed by the meat scraper 30 to be described hereinafter; and therefore, in certain instances, it may be desirable to entirely replace an existent gauge plate with a meat scraper appropriately mounted and connected to the aforementioned lateral adjustment mechanism 22.

With additional reference now to Figs. 2 and 3, the preferred form of meat scraper 30 includes a generally rectangular metal frame 32 that includes integral projecting flanges 34 adapted to slidably encompass the opposite edges of an existing gauge plate 20, such as shown in Fig. 1. It will be apparent that these flanges 34 must be specifically dimensioned to accommodate the specific gauge plate to which the meat scraper is to be attached, but, in principle, the slidable and thus readily removable attachment remains the same regardless of the precise dimensions of the gauge plate 20 and therefore of the flanges 34.

Rigidly mounted within the rectangular frame 32 are a plurality of parallel, spaced metallic strips 36. Each strip 36 is supported preferably at an angle of substantially 45° relative to the general plane of the frame 32 and the edges of all of the strips 36 lie in a common plane. The arrangement is such that when the meat scraper 30 is attached to the guide plate 20, as shown in Fig. 1, the metal strips 36 are disposed in vertical planes which lie at angles of 45° relative to the plane of the saw blade 14 and furthermore diverge in the direction of meat movement, as indicated by the arrow A in Fig. 3. The entire scraper 30 extends from a point adjacent the edge of the table portion 18 to a point beyond the blade 14 so as to provide a substantial area for engagement with a piece of meat to be cut.

Accordingly, when the meat scraper has been attached to the gauge plate 20 and the proper lateral setting to provide for a desired thickness of cut has been made, meat on the movable table portion 18 may be shoved laterally until the end thereof is brought against the edges of the metal strips 36. Thereafter, as the movable table portion is moved towards the saw blade 14, the meat is severed, and during the entire severance it is guided through its lateral engagement with the edges of the metal strips 36 of the meat scraper. During the cutting process, bone dust and ground suet accumulates primarily on the cut surface of the large piece of meat and little gathers on the cut slice, this being the result of the character of the band saw blade 14. After this initial cut has been made, the first cut or slice of meat is removed and the entire large piece of meat is again moved laterally against the edges of the metal strips 36. Since, during the initial cutting operation, bone dust and suet did accumulate on the cut surface, such dust will be scraped from the surface of the meat by the edges of the strips 36 as the meat is again moved forwardly for its second cut. Thus, it will be apparent that not only does the meat scraper 30 guide the meat and serve as a gauge for determining the thickness of cut, but it also and simultaneously scrapes the bone dust and suet from the surface thereof. Furthermore, it will be noted that this scraping from the surface of the meat is performed simultaneously with the cutting operation.

As the dust is scraped from the meat by the strip edges, it passes into the spaces between the strips 36. Since the strips 36 are of extended width, sufficient space for the accumulation of dust is provided to enable use of the scraper 30 for a considerable period of time before cleansing is required. When cleansing is required, the scraper 30 is merely lifted from its position over the gauge plate 20 and cleansed by appropriate placement in a rapid stream of water so that the dust is driven from the spaces between the strips 36.

Various modifications and/or alterations over and beyond those explicitedly mentioned hereinabove can obviously be made without departing from the spirit of the invention. Accordingly, the foregoing description of one embodiment thereof is to be considered as purely exemplary and not in a limiting sense and the actual scope of the invention is to be indicated by the appended claims.

What is claimed is:

1. In combination with a meat-cutting saw, a combination guiding and scraping member, said member having at least one elongated edge, and means rigidly supporting said member with said edge being in a plane spaced laterally from and substantially parallel to that of said saw.

2. In a combination according to claim 1, said guiding and scraping member constituting a thin metal strip disposed at an angle of substantially 45° relative to said parallel plane.

3. In combination with a meat cutting saw, a plurality of combination guiding and scraping members, each of said members having at least one elongated edge, and means rigidly supporting said members with said elongated edges in a plane spaced laterally from and substantially parallel to that of said saw.

4. In a combination according to claim 3, said guiding and scraping members constituting a plurality of parallel metal strips disposed angularly from said parallel plane so as to diverge therefrom in the direction of movement of meat against said meat cutting saw.

5. In combination with a meat cutting saw having an adjustable gauge plate for determining the thickness of the cut meat, a meat guiding and scraping unit including a frame, means for removably attaching said frame to said gauge plate on the side nearest the saw, and a plurality of combination guiding and scraping members supported rigidly in parallel relation on said frame, each of said members having at least one elongated edge, said edge being in a plane spaced laterally from and substantially parallel to that of said saw.

6. In combination with a meat cutting saw including a movable table for presenting the meat to said saw, a combination guiding and scraping unit including a frame mounted for lateral adjustment relative to the plane of said saw, and a plurality of combination guiding and scraping members supported rigidly in spaced parallel relation by said frame, each of said members having at least one elongated edge, said edge being in a plane spaced laterally from and substantially parallel to that of said saw.

References Cited in the file of this patent

UNITED STATES PATENTS 2,127,861     Gandriant _____ Aug. 23, 1938

OTHER REFERENCES

U.S. Dept. of Agriculture publication "Smear Remover Space Guide for Power Meat Saws," May 2, 1952, 4 pages.

Catalog Sheet from Biro Manufacturing Co., Marblehead, Ohio, entitled "Biro Meat Cleaner."